United States Patent
Owen

[11] Patent Number: 5,603,283
[45] Date of Patent: Feb. 18, 1997

[54] ILLUMINATED SNAP-ON GAUGE POINTER ASSEMBLY

[75] Inventor: Marvin L. Owen, Grand Blanc, Mich.

[73] Assignee: Delco Electronics Corporation, Kokomo, Ind.

[21] Appl. No.: 356,754

[22] Filed: Dec. 15, 1994

[51] Int. Cl.⁶ .................................................. G12B 11/04
[52] U.S. Cl. ......................... 116/284; 116/288; 116/328; 116/332
[58] Field of Search ............................ 116/62.1, 62.2, 116/62.3, 62.4, 286, 287, 288, 328, 329, 330, 331, 332, DIG. 6, DIG. 36; 324/154 PB; 368/228–238; 403/359, 361

[56] References Cited

U.S. PATENT DOCUMENTS

| | | | |
|---|---|---|---|
| 2,290,278 | 7/1942 | Failla | 116/287 X |
| 3,855,787 | 12/1974 | Assmus | 368/238 |
| 4,723,504 | 2/1988 | Griffin et al. | 116/332 |
| 4,811,445 | 3/1989 | Lagieski et al. | 403/361 X |
| 4,973,188 | 11/1990 | Glover et al. | 403/361 X |
| 5,062,135 | 10/1991 | Ohike | 324/154 PB X |
| 5,142,456 | 8/1992 | Murphy | 116/288 X |
| 5,259,333 | 11/1993 | Iino et al. | 116/286 |
| 5,319,527 | 6/1994 | Murphy et al. | 116/288 X |
| 5,546,888 | 8/1996 | Skiver et al. | 116/286 |

FOREIGN PATENT DOCUMENTS

| | | | |
|---|---|---|---|
| 492543 | 7/1992 | European Pat. Off. | 116/288 |
| 3824391 | 1/1990 | Germany | 116/288 |
| 48610 | 4/1980 | Japan | 116/286 |
| 6-82274 | 3/1994 | Japan | 116/288 |

*Primary Examiner*—William A. Cuchlinski, Jr.
*Assistant Examiner*—Willie Morris Worth
*Attorney, Agent, or Firm*—Jimmy L. Funke

[57] ABSTRACT

A gauge includes a transparent pointer driven through gears by a stepper motor offset from the pointer axis. An output gear on the pointer axis is transparent and has a first hub supporting the pointer and a second hub aligned with a lamp, so that light is passed through the output gear to the pointer. The first hub has retention pads molded onto its side. The pointer has a tubular sleeve with axial slots to allow expansion and has retention ribs which ride over the pads upon assembly and snap over the pads to secure the pointer in an axially fixed position. The sleeve also has tapered axial ribs which slide between the pads during assembly to angularly orient the pointer.

14 Claims, 2 Drawing Sheets

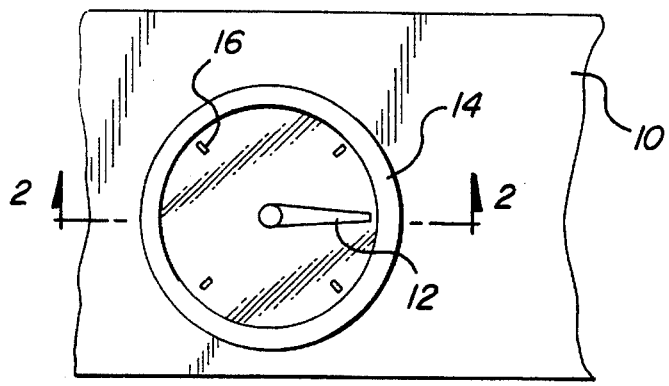
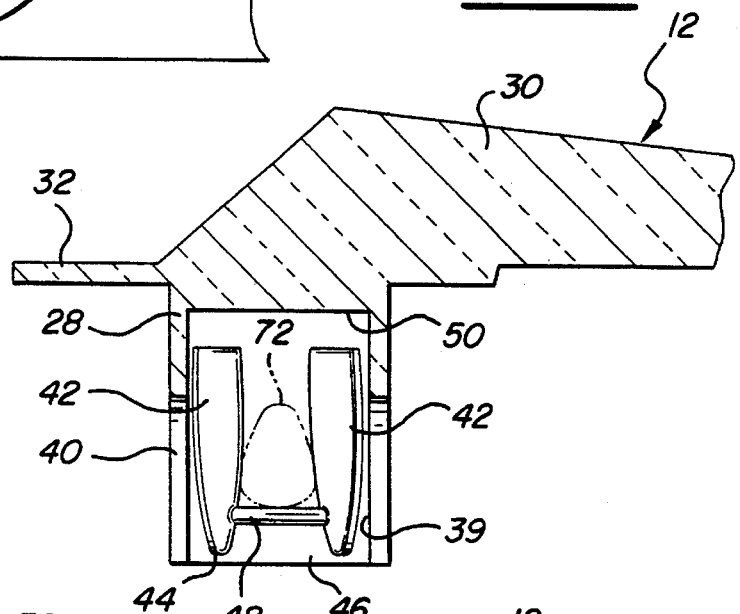
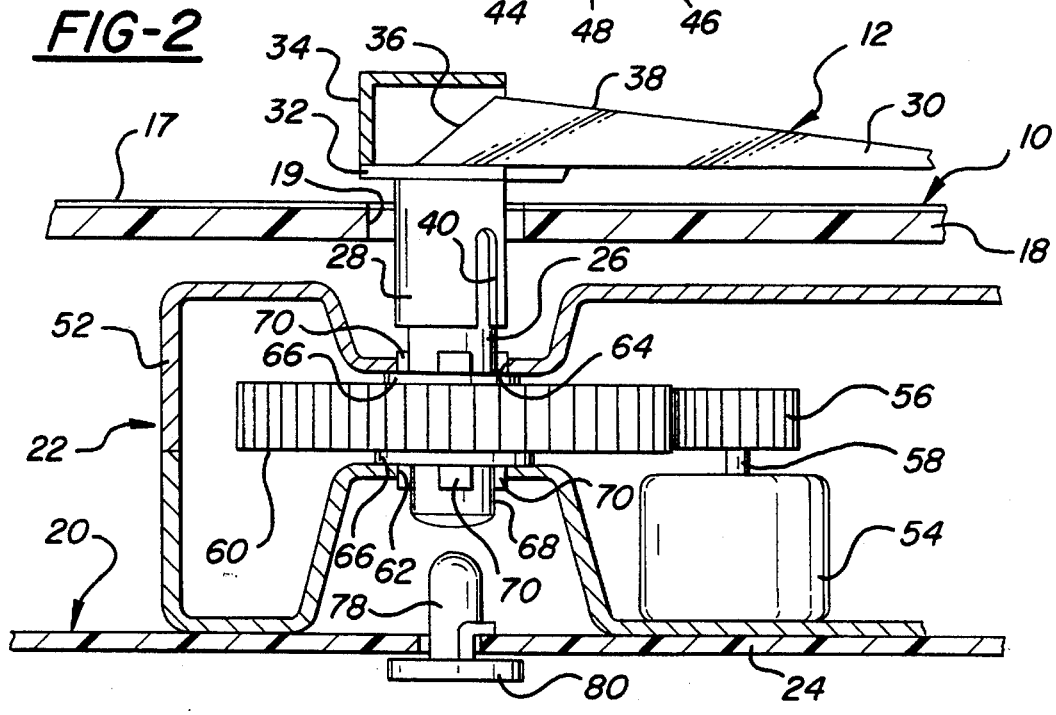

ILLUMINATED SNAP-ON GAUGE POINTER ASSEMBLY

FIELD OF THE INVENTION

This invention relates to automotive instrumentation and particularly to gauges with pointers including an improvement of pointer illumination.

BACKGROUND OF THE INVENTION

A majority of automotive gauge mechanisms presently used in instrument panels are air core gauge designs. These are typically attached to the back side of a transparent face plate comprising a light pipe with an applique placed on the front side. The graphics on the applique are illuminated for night visibility by placing miniature incandescent light bulbs in the rear of the instrument panel where electrical connections are also made to the gauges. The gauge pointers are molded in a clear plastic material with one or more surfaces inclined to effect internal reflection of light from the hub of the pointer to the tip. The clear plastic light pipe has molded-in extension arms that angle down to pick up light from the rear mounted light bulbs. Light travels through the light pipe to a hole surrounding each pointer hub where it enters the bottom of the pointer. Since the light intensity exiting the light pipe varies around the pointer hole, the pointer lighting is often not consistent as the pointer travels through its angular span.

In such gauges the pointers are mounted on metal spindles and are installed by forcing them down onto the spindles to a fixed height or maximum load. Loads, heights and angular position must be monitored and controlled. Robots and vision systems are used to accommodate this tedious and time consuming assembly/calibration procedure.

SUMMARY OF THE INVENTION

It is therefore an object of the invention to uniformly illuminate an instrument pointer for any angle. Another object is to accurately assemble such a pointer to a gauge without measuring height, load or angular position.

A gauge has a pointer rotatable about an axis and a stepper motor offset from the axis and coupled to the pointer by gears. The output gear is rotatable about the pointer axis and has a hub coupled to the pointer by a snap connection. The gear hub is a shaft with four external retention pads with inclined surfaces. The pointer also has a hub which is tubular and fits over the shaft. Internal details of the tubular hub include axially extending ribs which fit between the retention pads to establish a fixed angular relationship of the hubs to position the pointer in any chosen quadrant, and circumferential rib segments which interfere with and ride over the inclined pads upon assembly to provide a snap connection when the two hubs are assembled. Axial relief slots in the tubular hub lend sufficient resilience to allow assembly and snap action of the interfering elements. The axial ribs and the pads each are tapered with a narrow nose near the end of the respective hub and widening for increasing distances from the ends, so that as the hubs are pushed together the tapered elements assist in aligning the axial ribs mid-way between adjacent pads. Each axial rib engages both of its neighboring pads when the hubs are fully assembled, and the end of the shaft seats in the bottom of the tubular hub to positively position the pointer in the axial direction. Angular alignment of the pointer during assembly is not necessary other than selecting the right quadrant since the stepper motor operation requires recalibration of pointer position each time the system is powered up. Accordingly the assembly procedure is very simple, requiring only that the pointer hub be snapped onto the gear shaft and time consuming measurement and calibration procedures are avoided.

The illuminated pointer is made of transparent plastic and employs conventional light pipe technology for admitting light in the region of the hub and using inclined surfaces to reflect the light along the pointer needle, and a painted rear needle surface to reflect the light forward to the observer. Instead of supplying the light to the pointer through a transparent plate which also forms the face plate of the display, the light is transmitted through the output gear hub into the pointer hub. The output gear is also made of transparent plastic and a light source behind the gear transmits light through the gear to illuminate the pointer.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a partial front view of an instrument cluster showing a gauge pointer and dial;

FIG. 2 is a cross section of a gauge taken along line 2—2 of FIG. 1, according to the invention;

FIG. 3 is a cross section of the hub portion of the pointer of FIG. 2, according to the invention;

DESCRIPTION OF THE INVENTION

Figure 4:
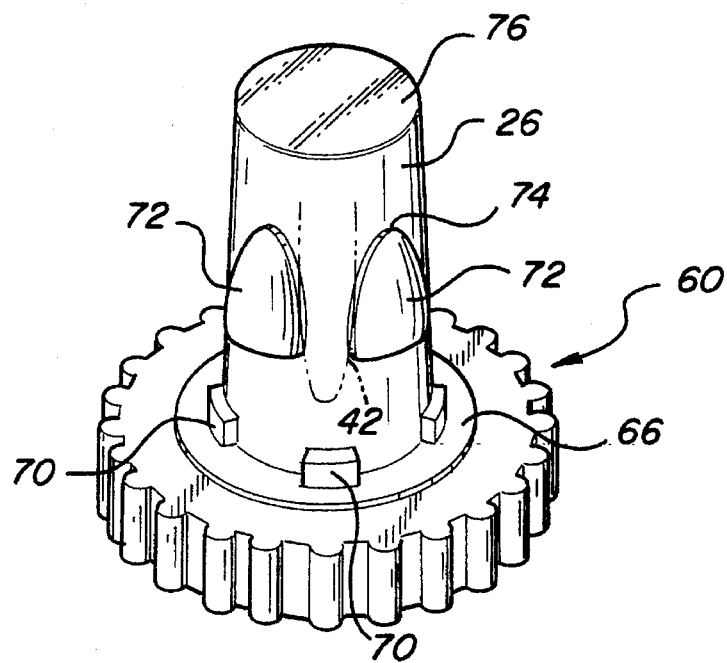
FIG. 4 is an isometric view of a gear of the gauge of FIG. 2, according to the invention.

FIG. 1 shows a portion of an automotive instrument panel 10 having a gauge pointer 12 and a dial 14 including indicia 16. In FIG. 2, the instrument panel 10 is shown to comprise a face plate 18 covered by an applique 17 which is decorative as well as including the indicia 16, and has an aperture 19. Where it is desired to illuminate the indicia, the face plate 18 may comprise a light pipe or transparent sheet illuminated by lamps located at its edge. A rear wall 20 of a cluster housing is spaced from the face plate and a gauge motor assembly 22 is mounted on the rear wall 20 between the wall and the face plate. Alternatively the motor may be mounted on the face plate to more accurately establish the pointer position. Printed circuit paths 24 on the rear wall 20 supply energizing voltage to the motor assembly 22. The motor assembly 22 has an output shaft 26 for supporting and driving the pointer 12.

The pointer 12 is molded of transparent plastic and comprises a hub 28 attached to the shaft 26 and a needle 30 carried by the hub 28. Illumination of the pointer is effected by light transmitted into the hub 28. A flange 32 laterally extending from the interface of the hub 28 and needle 30 supports an opaque cap or shield 34 which prevents light escape from the region of the hub 28. The needle 30 follows conventional design having a first outer inclined face 36 in front of the hub 28 and beneath the cap 34 for reflecting light injected in the region of the hub toward the tip of the needle, and a second outer inclined face 38 extending to the tip for reflecting the light to the rear face of the needle. A film of paint or other pigment on the rear surface of the needle then disperses the light forwardly, causing a visible glow. The hub 28 is a tubular sleeve defining a bore 39 and has two opposed axial relief slots 40. The inner surface of the hub 28 has a pair of axial ribs 42 on each side of the slots, each rib having a narrow nose 44 near the end 46 of the hub and flaring out at greater distances from the end. A rounded horizontal or circumferential rib 48 extends between the axial ribs 42 of each pair. The bore of the hub sleeve terminates at an end wall 50.

Referring again to FIG. 2, the motor assembly 22 includes a two-part housing 52 containing a stepper motor 54 offset from the pointer axis. The motor 54 carries a pinion gear 56 on its motor shaft 58, and an output gear 60 on the pointer axis is driven by the pinion gear 56. Where further gear reduction is desired, additional gears are arranged between the pinion 56 and output gear 60. The housing 52 contains a pair of apertures 62 and 64 aligned with the pointer axis and the output gear 60 is mounted in those apertures for rotation about that axis. The output gear 60 is molded of a transparent polymer and has on each side a thrust surface 66 bearing against the housing 52 and a lower hub 68 extending through the aperture 62 and an upper hub or shaft 26 extending through the aperture 64. Each gear hub has several bearing segments 70 projecting from the hub and journaled in the respective apertures 62 and 64. As best shown in FIG. 4, the hub 26 has four retention pads 72 equally spaced about the shaft. Each pad 72 is tapered in thickness as well as in width and has a narrow nose 74 pointed toward the end 76 of the hub and increases in width as the distance from the end 76 increases. Each pad 72 is relatively thin at the nose 74 and becomes thicker as its width increases.

Figure 5:
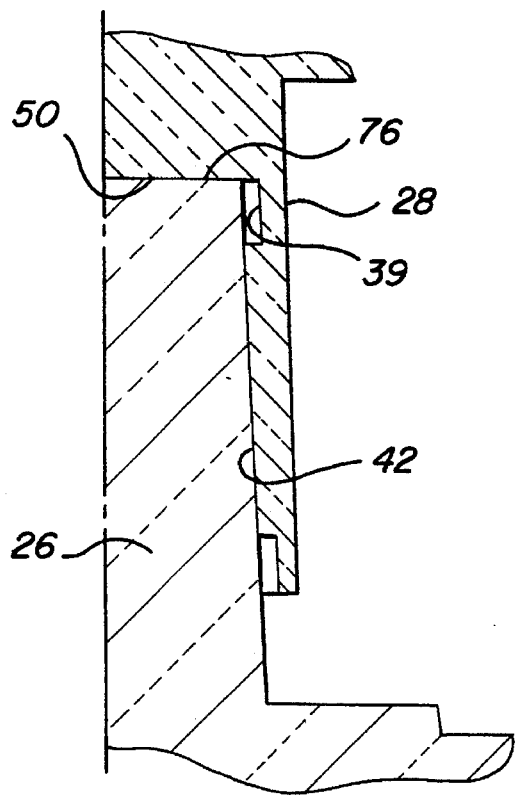
FIG. 5 is a cross section of assembled gear and pointer hubs taken through axial ribs of the pointer hub.

The pads 72 of the gear hub 26 and the axial ribs 42 of the pointer hub 28 cooperate to angularly align the gear and pointer during assembly. As the pointer hub 28 is pushed onto the gear hub 26 the ribs 42 slide between the pads 72. The narrow noses 44 and 74 assist in locating the ribs between the pads at the beginning of insertion and the tapered sides of the ribs and pads tend to mutually rotate the hubs until the axial ribs 42 are centered between the pads 72. In FIG. 3 the retention pad 72 is shown in phantom lines to illustrate the pad position when assembly is complete, and in FIG. 4, an axial rib is shown in phantom lines to illustrate the rib position when assembly is complete. The pads and ribs are dimensioned such that when insertion is complete a pad 72 will engage a rib 42 on each side, holding the parts against any further relative rotation. The assembled parts are illustrated in cross section in FIG. 5, showing that the end of the hub 76 seats against the end wall 50 of the hub 28 to positively establish the axial position of the pointer on the gear hub 26, and that the axial ribs 42 nest against the side of the hub 26 to firmly secure the parts in the lateral direction. A slight taper is evidenced in each hub due to the necessary draft in the molds, and this taper assures that the parts have a relatively loose fit at the beginning of assembly and that the fit gradually tightens during assembly.

Figure 6:
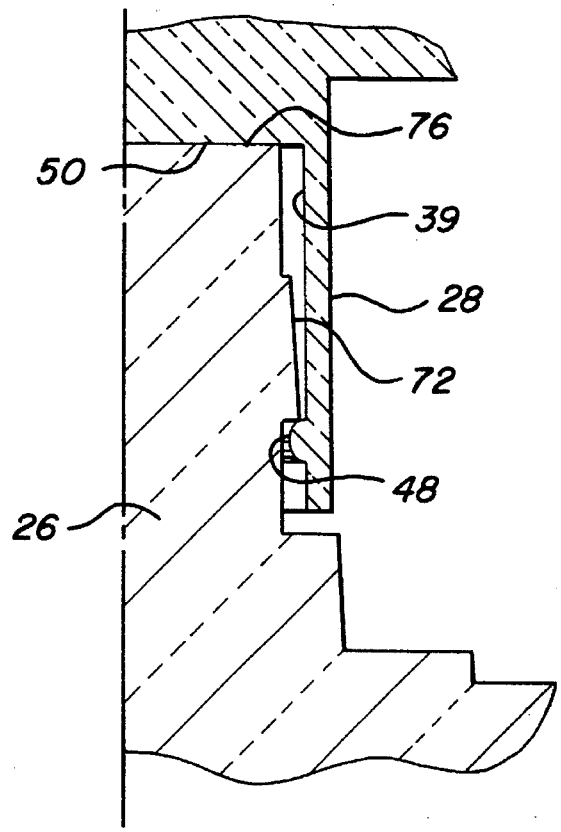
FIG. 6 is a cross section of assembled gear and pointer hubs taken through retention pads of the gear hub.

To provide a snap connection, each horizontal rib 48, shown in FIGS. 3 and 6, is dimensioned to interfere with a pad 72. During assembly, the rib 48 rides over the pad 72; the ramp surface of the pad aiding in the insertion. The relief slots 40 in the sleeve allow sufficient resilience for the sleeve to spread to accommodate the interference. When the pointer hub is completely assembled to the hub 26, the horizontal rib 48 snaps over the thick edge of the ramp and the end 76 of the hub 26 reaches the end wall of the pointer hub 28 as shown in FIG. 6, to hold the pointer against removal. In summary, when the pointer is installed on the gear hub, the axial ribs and the retention pads cooperate to orient the pointer relative to the gear and each horizontal rib ramps up the inclined surface of the pad as the sleeve expands as allowed by the relief slots. When the horizontal ribs snap over the bottom edges of the pads the gear hub seats in the tubular pointer hub.

As shown in FIG. 2, the lower gear hub 68 terminates a short distance above the rear wall 20 of the cluster housing. The rear wall 20 supports an incandescent lamp 78 or other light source on the pointer axis near the end of the lower gear hub 68. Since the gear 60 is molded of transparent material, light from the lamp 78 is transmitted through both of the gear hubs 68 and 26 into the pointer hub 28 and is then internally reflected throughout the pointer needle 30. The lamp 78 is installed in an aperture in the rear wall by a well known twist-in lamp socket 80 which engages printed circuit paths 24 to supply lamp current. Other light sources for illuminating the pointer include, for example, one or more surface mount light emitting diodes secured to the front side of the rear wall 20. In that event circuit paths would have to be provided on the front side of the rear wall 20. While it is desirable to locate the light source on the pointer axis, it is also feasible to locate it slightly offset from the axis; this would accommodate an alternative gear mount (not shown) having a spindle extending from the hub 68 to a bearing on the rear wall 20.

In operation of the gauge, each time the instrument cluster is energized the stepper motor turns the pointer to a zero reference or home position which is set by a mechanical stop, not shown. From there the motor steps to a desired indicating position under electronic control. Thus a calibration at the time of assembly is not needed. It is desirable, however, to have the pointer mounted in a designated quadrant, and this is reliably carried out by orienting the pointer approximately correctly at the beginning of assembly so that a final orientation is established by the interaction of the pads and axial ribs.

It will thus be seen that the gauge assembly with a snap-on pointer allows a quick and easy assembly procedure with a minimum of equipment, yet couples the pointer to the motor output gear at a predetermined angular and axial position relative to the gear hub. The same configuration also affords pointer illumination by an axially place light source so that the illumination intensity is independent of the pointer display angle. A further advantage is that the face plate does not necessarily have to incorporate a light pipe; even if it does, the light pipe design is simplified since it is relieved of the function of illuminating the pointers.

The embodiments of the invention in which an exclusive property or privilege is claimed are defined as follows:

1. In an instrument panel indicator having a pointer movable about an axis for arcuate travel across an outer face of an apertured panel, a gauge comprising:

a stepper motor including an output gear, the output gear being driven by the stepper motor;

support means behind the panel for supporting the stepper motor;

the output gear being mounted on the support means for rotation about the axis and having a gear hub extending toward the panel;

the pointer having a hub on the axis extending through an aperture in the panel and coupling with the gear hub; and the pointer hub and the gear hub together forming a snap connection.

2. The invention as defined in claim 1 wherein:

one of the pointer hub and the gear hub comprising a generally cylindrical shaft and the other hub having a tubular sleeve fitting around the shaft;

cooperating detent features on the shaft and sleeve for effecting the snap connection when the hubs are assembled; and the sleeve having axial slots for sleeve resilience during assembly.

3. The invention as defined in claim 1 wherein:

one of the pointer hub and the gear hub comprising a generally cylindrical shaft and the other hub having a tubular sleeve fitting around the shaft thereby defining interfacing surfaces;

one of the surfaces having retention pads and the other surface having circumferential ribs interfering with the pads; and the sleeve having axial slots for sleeve resilience to permit the ribs to ride over the pads during assembly and snap over the pads to effectuate the snap connection.

4. The invention as defined in claim 1 wherein:

one of the pointer hub and the gear hub comprising a generally cylindrical shaft and the other hub having a tubular sleeve fitting around the shaft thereby defining interfacing surfaces;

one of the surfaces having retention pads and the other surface having circumferential ribs interfering with the pads; and the retention pads being tapered in thickness to facilitate ramping of the ribs over the pads during assembly to snap over the pads for effectuating the snap connection.

5. The invention as defined in claim 1 wherein:

one of the pointer hub and the gear hub comprising a generally cylindrical shaft and the other hub having a tubular sleeve fitting around the shaft thereby defining interfacing surfaces;

one of the surfaces having retention pads and the other surface having circumferential ribs interfering with the pads to hold the hubs against separation.

6. The invention as defined in claim 1 wherein:

one of the pointer hub and the gear hub comprising a generally cylindrical shaft and the other hub having a tubular sleeve fitting around the shaft;

a plurality of retention pads on the shaft;

alignment ribs inside the sleeve extending between the retention pads; and circumferential ribs inside the sleeve extending between adjacent alignment ribs and interfering with the pads to hold the hubs against separation.

7. The invention as defined in claim 1 wherein:

the gear hub comprising a generally cylindrical shaft and the pointer hub having a tubular sleeve fitting around the shaft;

a plurality of retention pads on the shaft;

axial alignment ribs inside the sleeve extending between the retention pads;

circumferential ribs inside the sleeve extending between adjacent alignment ribs and interfering with the pads to hold the hubs against separation; and axial relief slots in the sleeve to afford resilience for the snap connection of the hubs.

8. The invention as defined in claim 1 including:

the gear hub comprising a generally cylindrical shaft and the pointer hub having a tubular sleeve fitting around the shaft;

a plurality of retention pads on the shaft;

axial alignment ribs inside the sleeve extending between and contacting adjacent retention pads for holding the hubs against relative rotation.

9. The invention as defined in claim 1 including:

the gear hub comprising a generally cylindrical shaft having an end and the pointer hub having a tubular sleeve fitting over the shaft end;

a plurality of retention pads on the shaft, the pads being tapered and having a narrow nose portion extending toward the shaft end and flared outwardly away from the end;

axial alignment ribs inside the sleeve, the ribs being tapered and having a narrow nose portion extending toward an end of the sleeve and flared outwardly away from the sleeve end, whereby the tapered ribs and pads facilitate assembly of the hubs to align the gear and pointer.

10. The invention as defined in claim 1 wherein:

the gear hub includes an end engaging a portion of the pointer hub for axially positioning the pointer on the gear hub.

11. The invention as defined in claim 1 wherein:

the pointer hub has a bore receiving the gear hub, the bore terminating in an inner face engaging an end of the gear hub when assembled for axially positioning the pointer on the gear hub.

12. The invention as defined in claim 1 wherein the pointer and the gear are made of transparent material; and a light source located at a side of the gear opposite the pointer illuminates the gear, whereby light is transmitted through the gear hub for illumination of the pointer.

13. The invention as defined in claim 1 wherein the pointer and the output gear are made of transparent material, and wherein:

the output gear has a second hub extending away from the panel; and a light source on the support means for illuminating the second hub whereby light is transmitted through the gear hubs for illumination of the pointer.

14. The invention as defined in claim 1 wherein the pointer and the output gear are made of transparent material, and wherein:

the output gear has a second hub extending away from the panel;

the support means comprises a motor housing supporting the output gear and a cluster housing supporting the motor housing;

a printed circuit on the cluster housing; and a light source on the cluster housing and coupled to the printed circuit for illuminating the second hub whereby light is transmitted through the gear hubs for illumination of the pointer.

* * * * *